US009247541B2

(12) United States Patent
Kim et al.

(10) Patent No.: US 9,247,541 B2
(45) Date of Patent: Jan. 26, 2016

(54) SELECTING FREQUENCY BANDS FOR TRANSMITTING DATA PACKETS

(75) Inventors: Youhan Kim, Albany, CA (US); James Cho, Mountain View, CA (US); Kai Shi, Sunnyvale, CA (US); Ning Zhang, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 13/233,861

(22) Filed: Sep. 15, 2011

(65) Prior Publication Data

US 2012/0069804 A1 Mar. 22, 2012

Related U.S. Application Data

(60) Provisional application No. 61/383,637, filed on Sep. 16, 2010.

(51) Int. Cl.
*H04B 7/00* (2006.01)
*H04W 72/04* (2009.01)
*H04L 1/06* (2006.01)
*H04L 5/00* (2006.01)

(52) U.S. Cl.
CPC ......... *H04W 72/0453* (2013.01); *H04L 5/0044* (2013.01); *H04L 1/0643* (2013.01); *H04L 5/0023* (2013.01); *H04L 5/0053* (2013.01)

(58) Field of Classification Search
CPC .................................................. H04W 76/025
USPC ......... 370/310, 328, 329, 343, 431, 464, 465; 455/422, 450–452
See application file for complete search history.

(56) References Cited

U.S. PATENT DOCUMENTS

| | | | |
|---|---|---|---|
| 6,952,454 B1 | 10/2005 | Jalali et al. | |
| 7,324,605 B2 * | 1/2008 | Maltsev et al. | 375/299 |
| 7,512,083 B2 * | 3/2009 | Li | 370/269 |
| 8,068,455 B2 * | 11/2011 | Utsunomiya et al. | 370/329 |
| 8,345,547 B2 * | 1/2013 | Park | 370/229 |
| 8,417,253 B2 * | 4/2013 | Gong | 455/450 |
| 8,532,066 B2 | 9/2013 | Fernandez-Corbaton et al. | |
| 8,660,497 B1 * | 2/2014 | Zhang et al. | 455/63.1 |
| 8,773,969 B1 * | 7/2014 | Zhang et al. | 370/208 |
| 2003/0236584 A1 | 12/2003 | Kuwaoka | |

(Continued)

FOREIGN PATENT DOCUMENTS

| | | |
|---|---|---|
| CN | 101729156 A | 6/2010 |
| WO | 0205506 A2 | 1/2002 |
| WO | 2009052363 | 4/2009 |

OTHER PUBLICATIONS

IEEE 802.11n standard, IEEE, Sep. 2009, pp. 1 and 247-267, total 22 pages.*

(Continued)

*Primary Examiner* — Dmitry H Levitan
(74) *Attorney, Agent, or Firm* — Bever, Hoffman & Harms, LLP

(57) ABSTRACT

A first combination of frequency bands is selected for transmitting a first data packet, and a second, different combination of frequency bands is selected for transmitting a second data packet. A data stream is divided into a first set of data and a second set of data. The first set of data is allocated to the first combination of frequency bands, and the second set of data is allocated to the second combination of frequency bands.

15 Claims, 8 Drawing Sheets

(56) References Cited

U.S. PATENT DOCUMENTS

| | | | |
|---|---|---|---|
| 2005/0152473 A1 | 7/2005 | Maltsev et al. | |
| 2010/0260138 A1* | 10/2010 | Liu et al. | 370/330 |
| 2010/0260159 A1 | 10/2010 | Zhang et al. | |
| 2011/0038332 A1* | 2/2011 | Liu et al. | 370/329 |
| 2011/0096747 A1* | 4/2011 | Seok | 370/329 |
| 2011/0096796 A1* | 4/2011 | Zhang et al. | 370/474 |
| 2011/0190011 A1* | 8/2011 | Choi et al. | 455/466 |
| 2012/0002756 A1* | 1/2012 | Zhang et al. | 375/308 |

OTHER PUBLICATIONS

International Search Report and Written Opinion—PCT/US2011/051944—ISA/EPO—Jan. 18, 2012.

Kim Y. et al. "160 MHz Transmission Flow", IEEE802.11-1011063r0, Sep. 2010 (19 pages).

Kim Y. et al. "160 MHz Transmissions", IEEE 802.11-10/0774r0, Jul. 12, 2010 (25 pages), URL: https://mentor.ieee.org/802.11/dcn/10/11-10-0774-00-00ac-160-mhz-transmissions.ppt.

Srinivasa et al. "11ac 80MHz Transmission Flow, 0548r2," IEEE 802.11 IEEE 802.11-10, May 17, 2010, pp. 1-23, XP002662817, Retrieved From the Internet: URL: https://mentor.ieee.org/802.11/dcn/10/11-10-0548-02-00ac-80mhz-transmission-flow.ppt&ei=8H-xTr6HB5Gd0oG0-P4B&usg=AFQjCNHjf_MBw4HI59caqe50UoNDOFcfng&cad=rja [retrieved on Nov. 4, 2011] the whole document.

Stacey, R. "Proposed Specification Framework for TGac (11-09/0992r13)", Jul. 15, 2010, pp. 1-21, XP55010559, Retrieved From the Internet: URL:https://mentor.ieee.org/802.11/dcn/09/11-09-0992-13-00ac-proposed-specificationframework-FOR-tgac.doc.

* cited by examiner

SELECTING FREQUENCY BANDS FOR TRANSMITTING DATA PACKETS

RELATED U.S. APPLICATION

This application claims priority to U.S. Provisional Patent Application No. 61/383,637, "Architecture for Wider Bandwidth," by Kim et al., filed Sep. 16, 2010, hereby incorporated by reference in its entirety.

BACKGROUND

The IEEE (Institute of Electrical and Electronics Engineers) 802.11ac wireless computer networking standard allows, among other things, wider radio frequency (RF) bandwidth, up to 160 MHz, at frequencies below six GHz (referred to as the five (5) GHz band). As with any frequency spectrum, the 5 GHz band will become increasingly more crowded because it includes a limited amount of frequencies that have to be shared by a growing number of users, devices, and applications. Generally speaking, there exists only a finite amount of spectrum in the 5 GHZ band, and an increasing number of users are going to want to consume it.

Furthermore, at times, certain portions of the 5 GHz band may be unavailable due to local interference that exists in nature (e.g., atmospheric disturbances) or comes from devices that are not RF sources (e.g., power lines). The presence of radar can also reduce the probability of operating in a contiguous 160 MHz bandwidth because the Federal Communications Commission requires a channel to be vacated if radar is detected. Consequently, within the 5 GHz band, there may be times at which a transmitter cannot detect an available contiguous 160 MHz spectrum.

Thus, while the capability exists to utilize bandwidths up to 160 MHz, that amount of bandwidth may not always be available.

SUMMARY

In an IEEE 802.11ac embodiment according to the present invention, a 160 MHz spectrum can be segmented into a first 80 MHz segment and a second 80 MHz segment. The first and second segments may be contiguous to one another, or they may not be (that is, they may be separated from each other by a frequency band). In one such embodiment, the first segment and the second segment are divisible into one or more frequency bands, with each band a multiple of 20 MHz. For example, the first segment may be divided into two bands of 40 MHz each, and the second segment may be divided into two bands of 40 MHz each. Different combinations of the frequency bands, including the combination that includes all of the bands (that is, the entire 160 MHz spectrum), can be selected on a packet-by-packet basis. If all the frequency bands in the two segments are available, then all the frequency bands can be used to transmit a data packet. If only some of the frequency bands are available, then only the available frequency bands may be selected to transmit a data packet.

More generally, in one embodiment, a first combination of frequency bands is selected for transmitting a first data packet, and a second, different combination of frequency bands is selected for transmitting a second data packet. In one such embodiment, a data stream is divided into a first set of data (e.g., bits or data units) and a second set of data (e.g., bits or data units). The first set of data is allocated to the first combination of frequency bands, and the second set of data is allocated to the second combination of frequency bands.

In one embodiment, each data packet includes information that identifies the selected frequency bands being used to transmit that data packet. In one such embodiment, one or more bit values in a data packet are set to indicate the combination of frequency bands being used for that data packet.

Thus, if an entire frequency spectrum (e.g., a 160 MHz spectrum) is not available, at least the available portion of that spectrum may be used to transmit data packets. Consequently, utilization of the spectrum is improved, and the total amount of time (measured as elapsed time) needed to transmit a given quantity of data (or number of data packets) can be reduced.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present invention and, together with the description, serve to explain the principles of the invention.

DETAILED DESCRIPTION

Figure 1:
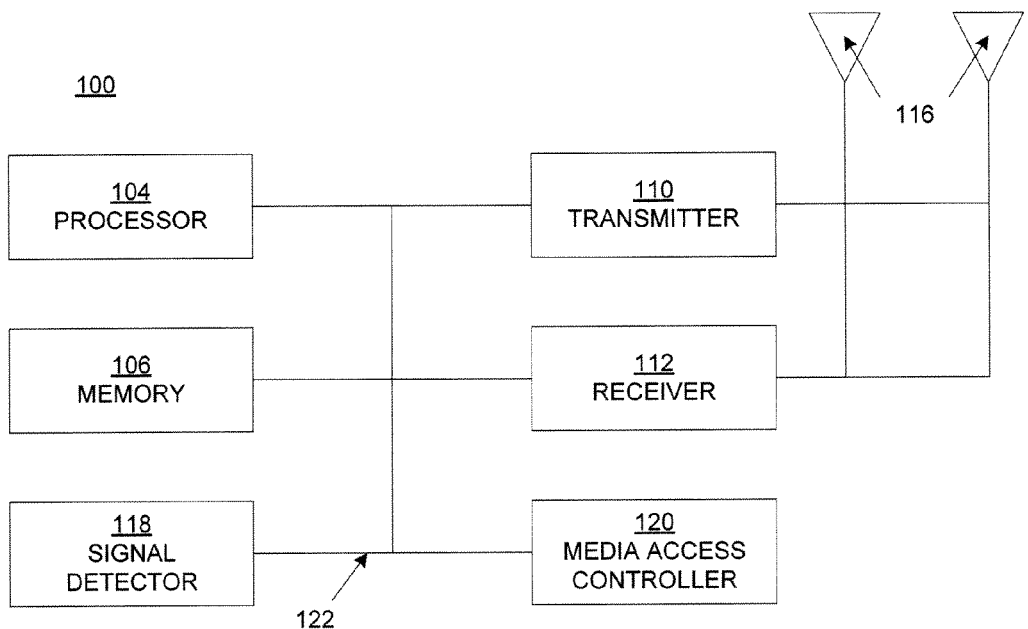
FIG. 1 is a block diagram of an example of a wireless device upon which embodiments according to the present invention may be implemented.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "selecting," "parsing," "allocating," "including," "setting," "obtaining," "transmitting," "receiving," "dividing," or the like, refer to actions and processes (e.g., flowchart 300 of FIG. 3) of a computer system or similar electronic computing device (e.g., a wireless device such as device 100 of FIG. 1) or a processor. The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 illustrates various components that may be utilized in a wireless device 100 upon which embodiments according to the present invention may be implemented. The wireless device 100 may be a base station, an access point, or a user terminal in a wireless communication network, and may be, for example, a cell phone or smart phone, a computer system, a satellite navigation system device, or the like.

The wireless device 100 may include a processor 104 which controls operation of the wireless device 100. Memory 106, which may include both ROM and RAM, provides instructions and data to the processor 104. A portion of the memory 106 may also include non-volatile random access memory (NVRAM).

In the example of FIG. 1, the wireless device 100 includes a transmitter 110 and a receiver 112. The transmitter 110 and receiver 112 may be combined into a transceiver. One or more antennas 116 are coupled to the transceiver, wherein the transmitter 110 and the receiver 112 can be coupled to one or more antennas 116. The transmitter 110 may include multiple transmit chains, and the receiver 112 may include multiple receive chains. Thus, the wireless device 100 may be implemented as a multiple-in, multiple-out (MIMO) device.

In one embodiment, the wireless device 100 includes a signal detector 118 that may be used to detect and quantify the level of signals received by the transceiver, such as total energy, energy per subcarrier per symbol, power spectral density, and the like. The wireless device 100 may also include a media access controller (MAC) 120 that may provide or receive a data stream for use in the wireless device 100. In one embodiment, the data stream may be may be derived from data associated with or related to a data link layer.

The various components of the wireless device 100 may be coupled together by a bus system 122, which may include a power bus, a control signal bus, and a status signal bus in addition to a data bus.

The transmitter 110 is operable for producing signals to be transmitted from a data stream. According to embodiments of the invention, the transmitter 110 can divide the data stream into different frequency bands. One data packet can be sent using one combination of the frequency bands, and another data packet can be sent using another combination of the frequency bands, depending on which frequency bands are available. The transmitter 110 can be implemented in different ways; see FIGS. 4, 5, 6, and 8A, for example.

In an IEEE 802.11ac embodiment, for example, a 160 MHz spectrum can be segmented into a first 80 MHz segment and a second 80 MHz segment. The first and second segments may be contiguous to one another, or they may be separated by one or more frequency bands. In one such embodiment, the first segment and the second segment are divisible into one or more frequency bands, with each band a multiple of 20 MHz. For example, the first segment may be divided into two bands of 40 MHz each, and the second segment may be divided into two bands of 40 MHz each. In an IEEE 802.11ac embodiment, the first band in the first segment includes a 20 MHz primary channel. The primary channel is used to send control information and can be used to facilitate communication between an IEEE 802.11ac device and a legacy device, and is included in each transmission.

Different combinations of the frequency bands, including the combination that includes all of the bands (that is, the entire 160 MHz spectrum, for example), can be selected on a packet-by-packet basis. If all the frequency bands in the two segments are available, then all the frequency bands can be used to transmit a data packet. If only some of the frequency bands are available, then only the available frequency bands may be selected to transmit a data packet.

Figure 2:
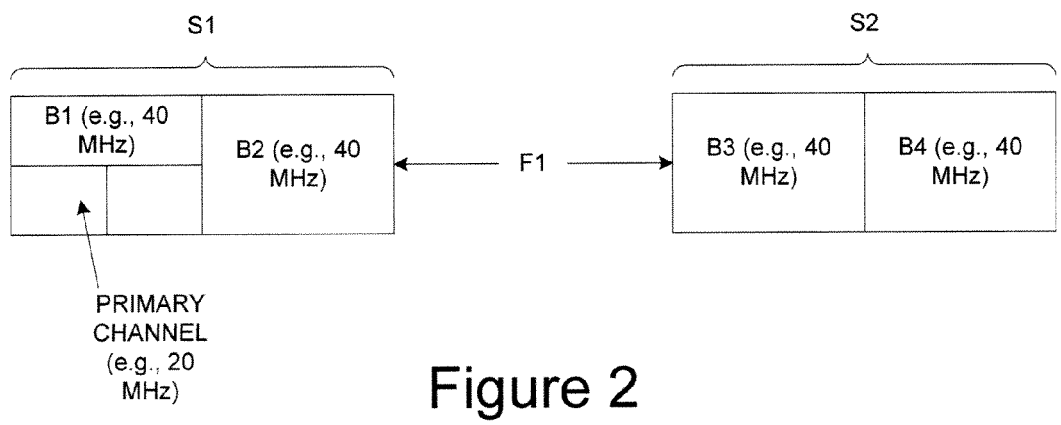
FIG. 2 illustrates an example of frequency bands in a frequency spectrum in an embodiment according to the present invention.

FIG. 2 illustrates an example of frequency bands in a frequency spectrum in an embodiment according to the present invention. For simplicity of discussion, FIG. 2 is discussed in the context of an IEEE 802.11ac embodiment. However, the present invention is not so limited. The example of FIG. 2 can be extended to other wireless computer networking standards, and can be adapted to other frequency spectrums and bands.

In the example of FIG. 2, a 160 MHz frequency spectrum is divided into a first frequency spectrum (segment S1) of 80 MHz and a second frequency spectrum (segment S2) of 80 MHz. In one embodiment, the first segment S1 and the second segment S2 are non-contiguous; that is, the first segment S1 is separated from the second segment S2 by a frequency band F1. Exemplary values for frequency band F1 can be multiples of 20 (e.g. 20, 40, or 80 MHz) or any arbitrary value (e.g. 100 or 200 MHz) greater than zero. In another embodiment (not shown), the first and second segments S1 and S2 are contiguous with one another (F1 is zero).

In the example of FIG. 2, the first segment S1 is itself divided into a first set of frequency bands, and the second segment S2 is also divided into a second set of frequency bands. In one embodiment, the first set of frequency bands includes a first 40 MHz band B1 (which includes the primary channel) and a second 40 MHz band B2, and the second set of frequency bands includes a first 40 MHz band B3 and a second 40 MHz band B4.

In operation, the wireless device 100 (FIG. 1) determines the bandwidth that is available for transmitting a data packet to another wireless device ("listen before talk"). Alternatively, the other wireless device can notify the wireless device 100 of what bandwidth is available. For example, the other wireless device can send a "clear to transmit" signal that identifies what bandwidth is available.

Once the wireless device 100 knows the available bandwidth, it can select one or more of the frequency bands B1-B4 to use to transmit data packets. For example, at time T1, two non-contiguous bandwidths of 80 MHz each may be available. Accordingly, one or more data packets can be allocated to and sent using all of the frequency bands B1-B4. At time T2, perhaps only 80 MHz (contiguous) is available (e.g., segment S2 is unavailable and frequency bands B1 and B2 are available), in which case one or more data packets can be allocated to and sent using, for example, the frequency bands B1 and B2. At time T3, perhaps an additional 40 MHz is available (e.g., perhaps frequency bands B1, B2, and B3 are available), in which case one or more data packets can be allocated to and sent using the frequency bands B1, B2, and B3.

As noted above, embodiments according to the present invention are not limited to the specific examples described in FIG. 2. In general, according to embodiments of the invention, a frequency spectrum can be divided into two or more frequency segments (e.g., S1, S2, . . . ) of any practical width. The segments may or may not be contiguous to one another, and may or may not have the same widths. One or more of the segments can be further divided into a set of frequency bands (e.g., B1, B2, . . . ; and B3, B4, . . . ) of any practical width; the frequency bands may or may not have the same widths. Depending on the available bandwidth, different combinations of the frequency bands can be used to send data packets. The combination of frequency bands can be selected on a per-packet basis; that is, one or more packets can be sent with one combination of one or more (including all) of the frequency bands, followed by one or more packets that may be sent with another combination of one or more (including all) of the frequency bands, and so on. The frequency bands included in a particular combination of frequency bands may or may not be contiguous with one another; for example, a packet can be sent using frequency bands B1 and B2, or using frequency bands B1 and B3.

In one embodiment, each data packet includes information that identifies the frequency bands selected for that packet. In one such embodiment, one or more bit values in a data packet are set to indicate the combination of frequency bands being used for that data packet.

To implement the example of FIG. 2, four bit values b0, b1, b2, and b3 can be used to indicate the frequency bands that are being used to transmit a data packet. In one embodiment, the four bit values are included in a Very High Throughput-Signals field (e.g., the VHT-SIG-A field) in the data packet's preamble. A different number of bits can be used, depending on the number or combination of frequency bands that may be used to transmit a data packet. For example, IEEE 802.11ac limits the possible bandwidth modes to the following: contiguous 20 MHz, contiguous 40 MHz, contiguous 80 MHz, non-contiguous 80 plus 80 MHz, or contiguous 160 MHz. Thus, only two bits may be used to indicate the frequency bands being used to transmit a data packet.

Table 1 is an example of bit values that can be used to indicate the selected combination of frequency bands, based on the example of FIG. 2.

TABLE 1

Example Bit Values

| Value | b0 (B1) | b1 (B2) | b2 (B3) | b3 (B4) |
|---|---|---|---|---|
| 0 | 20 MHz (primary channel only) | Not used | Not used | Not used |
| 1 | 40 MHz | Used | Used | Used |

Table 2 is an example of some of the possible bandwidth configurations based on the example of FIG. 2, and also shows the corresponding values of the bits b0-b3 and the number of data tones. Other bandwidth configurations are possible but are not included in Table 2 for simplicity.

TABLE 2

Examples of Bandwidth Configurations

| Bit Values (b3 b2 b1 b0) | S1 Bandwidth (data tones) | S2 Bandwidth (data tones) | Total Bandwidth (data tones) |
|---|---|---|---|
| 0000 | 20 MHz (52) | — | 20 MHz (52) |
| 0001 | 40 MHz (108) | — | 40 MHz (108) |
| 0011 | 80 MHz (234) | — | 80 MHz (234) |
| 0101/1001 | 40 MHz (108) | 40 MHz (108) | 80 MHz (216) |
| 0111/1011 | 80 MHz (234) | 40 MHz (108) | 120 MHz (342) |
| 1101 | 40 MHz (108) | 80 MHz (234) | 120 MHz (342) |
| 1111 | 80 MHz (234) | 80 MHz (234) | 160 MHz (468) |

Figure 3:
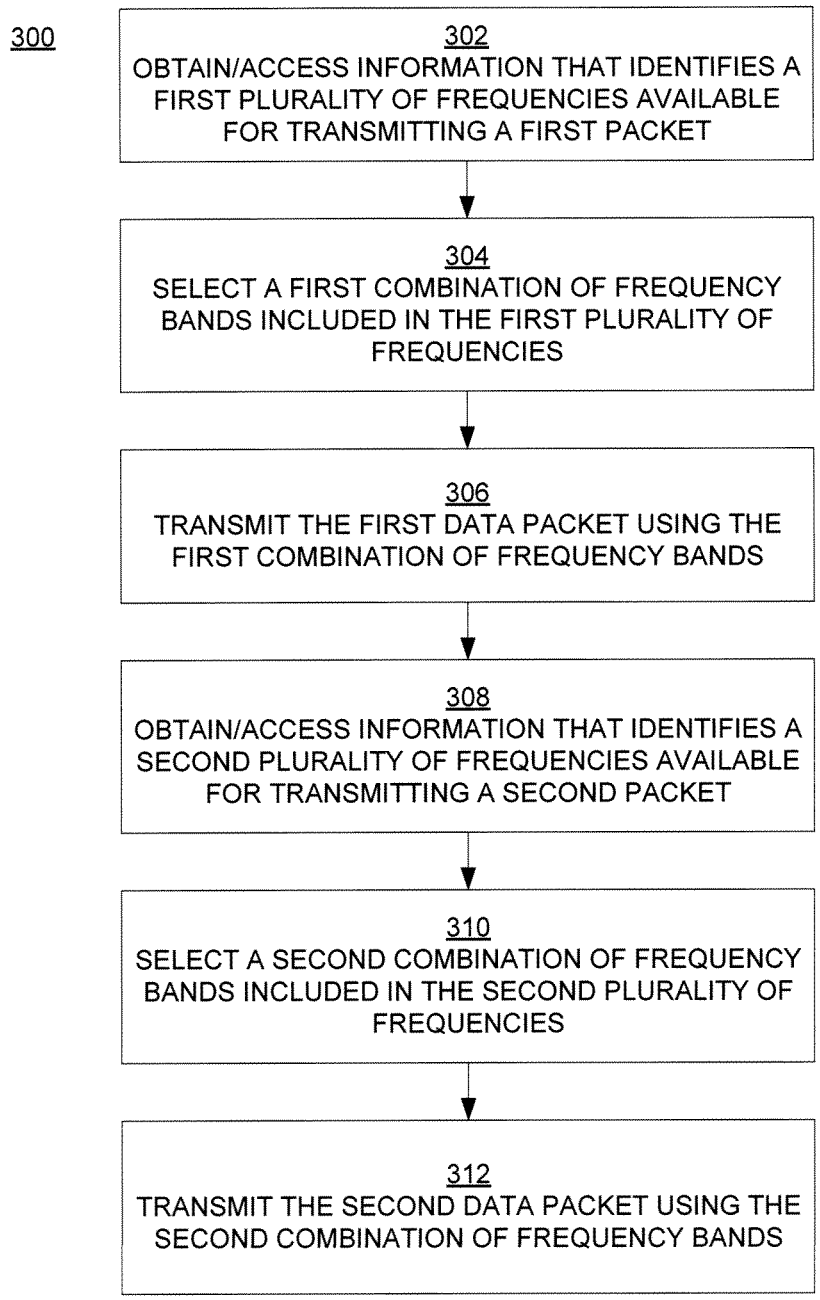
FIG. 3 is a flowchart showing an example of a method for transmitting data packets according to an embodiment of the present invention.

FIG. 3 is a flowchart 300 showing an example of a method for transmitting data packets according to an embodiment of the present invention. In one embodiment, the operations described below are performed by the wireless device 100, specifically the transmitter 110, of FIG. 1. As mentioned above, the transmitter 110 can be implemented in different ways; see FIGS. 4, 5, 6, and 8A, for example.

Although specific steps are disclosed in FIG. 3, such steps are exemplary. That is, embodiments according to the present invention may include various other steps or variations of the steps recited in FIG. 3. Also, the steps in FIG. 3 may be performed in an order other than the order in which they are described.

In block 302, information that identifies a first plurality of frequencies available for transmitting a first packet is obtained/accessed. In an IEEE 802.11ac embodiment, for example, the first plurality of frequencies could include a contiguous spectrum of 160 MHz or less, or two non-contiguous spectrums of 80 MHz each or less (e.g., one or both may have a width less than 80 MHz).

In block 304, a first combination of frequency bands is selected. The first combination is selected from a first set of frequency bands included in the first plurality of frequencies. The first combination of frequency bands can include any combination of the frequency bands B1, B2, B3, and B4 (FIG. 2), for example, depending on the amount of available bandwidth in the first plurality of frequencies.

In block 306 of FIG. 3, the first data packet is transmitted using the first combination of frequency bands.

In block 308, information that identifies a second plurality of frequencies available for transmitting a second packet is obtained/accessed, where the second plurality of available frequencies is different from the first plurality of available frequencies. As above, in an IEEE 802.11ac embodiment, for example, the second plurality of frequencies could include a contiguous spectrum of 160 MHz or less, or two non-contiguous spectrums of 80 MHz each or less (e.g., one or both may have a width less than 80 MHz).

In block 310, a second combination of frequency bands is selected. The second combination is selected from a second set of frequency bands included in the second plurality of frequencies. The second combination of frequency bands can include any combination of the frequency bands B1, B2, B3, and B4 (FIG. 2), for example, depending on the amount of available bandwidth in the second plurality of frequencies. The second combination may be different from the combination of frequencies used to transmit the first packet.

In block 312 of FIG. 3, the second data packet is transmitted using the second combination of frequency bands.

Thus, according to the present invention, if an entire frequency spectrum (e.g., a 160 MHz spectrum) is unavailable, at least the available portion of that spectrum may be used to transmit data packets. Consequently, utilization of the spectrum is improved, and the total amount of time (measured as elapsed time) needed to transmit a given quantity of data (or number of data packets) can be reduced.

Figure 4:
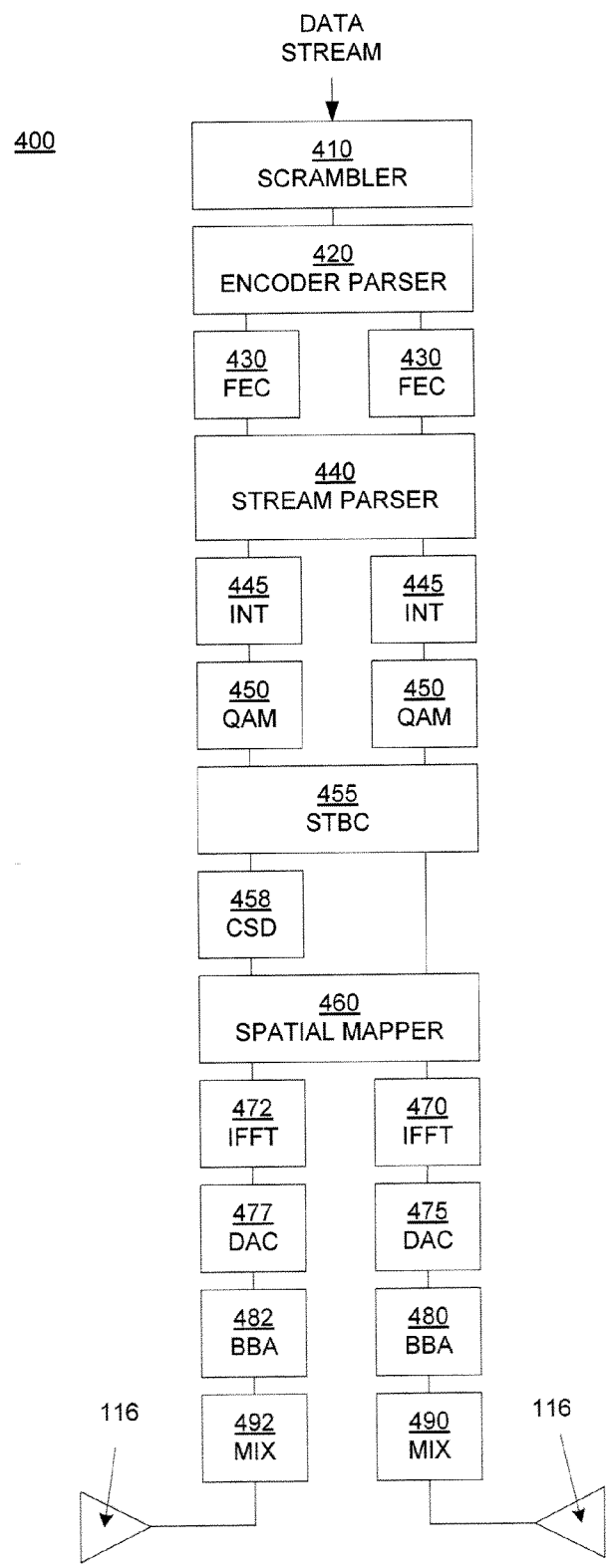
FIG. 4 is a block diagram of an example of a transmitter that can be used to implement embodiments according to the present invention.

FIG. 4 is a block diagram of an exemplary transmitter 400 that can be used to implement embodiments according to the present invention. The transmitter 400 can implement the transmitter 110 of FIG. 1. The transmitter 400 can be used to generate signals having different combinations of frequencies (as shown in Table 2), depending on what frequencies are available (as described above in conjunction with FIGS. 2 and 3).

The source of data in FIG. 4 may be the data link layer, which presents packet localized data. Such data may be scrambled in a scrambler 410, to produce a data stream with a relatively balanced number of ones and zeroes. The scrambled data stream is then parsed by an encoder parser 420 to divide the packetized data into modular elements over which a forward error correction (FEC) protocol can be executed in the FEC blocks 430. The encoder parser 420 may be used when some coding, such as a convolutional coding, is desired. In some embodiments, the encoder parser 420 may be omitted when a Low Density Parity Check (LDPC) is employed elsewhere in the processing of the transmit data path. In one embodiment, the encoder parser 420 may parse an incoming data stream in a bit-wise or block-wise round-robin fashion.

The FEC blocks 430 may encode the stream of data with any common forward error correction coding. Such coding adds additional data (e.g., additional, redundant bits) to allow a receiver to correct reception or transmission errors. In the example of FIG. 4, the entire effective data link layer is encoded across the complete bandwidth. The output of the FEC blocks 430 is streamed to a stream parser 440, which collects the output and then feeds data into multiple parallel paths. In this embodiment, the stream parser 440 parses the data from the FEC blocks 430 into two streams. In other embodiments, the stream parser 440 may parse the stream into three or more streams. In yet other embodiments, the stream parser 440 may be bypassed when only one stream (e.g. one path of QAM) is to be used. The number of streams in any particular embodiment as well as the configuration of multiple blocks of transmitter 400 can be configured to conform to 802.11ac and/or take into account other considerations. The stream parser 440 may parse bits in a round-robin bit-wise fashion. In alternative embodiments, the stream parser 440 may parse groups of bits in a round-robin fashion, or in any random or pseudo-random manner.

The output of the stream parser 440 is coupled to interleaver (INT) blocks 445. The interleaver blocks 445 may use any well-known interleaving method. In one embodiment, an interleaver may be implemented with memory. Incoming data may be written into rows of the memory while outgoing data may be read out of columns of the memory. In this embodiment, data is interleaved across the entire band of interest. The interleavers 445 may be coupled to respective quadrature amplitude mapping (QAM) blocks 450.

In one embodiment, the outputs of the QAM blocks 450 are coupled to a space-time block coder (STBC) 455, which performs space-time block coding. In one embodiment, the output of one of the QAM blocks is coupled to a cyclic shift delayer (CSD) 458. A CSD may help prevent unintentional beamforming.

The two streams (in this embodiment, one from the "upper" QAM block 450 and one from the CSD 458) are coupled to a spatial mapper 460 as shown in FIG. 4. The spatial mapper 460 may determine how data from the upper QAM block 450 and data from the CSD 458 are distributed to streams for transmission according to which tones are to be transmitted and how much bandwidth is allocated to the IFFTs. In this embodiment, the spatial mapper 460 maps data to two streams. Each stream is coupled to a respective inverse fast Fourier transform (IFFT) processor 470 and 472. If the transmission is to occur over bands that are not contiguous to one another (non-contiguous transmission), then the output of the spatial mapper 460 for each stream may be split into multiple streams, with each stream being coupled to a separate IFFT. The outputs of the IFFTs 470 and 472 are coupled to digital-to-analog converters (DACs) 475 and 477, respectively.

In one embodiment, the outputs of the DACs 475 and 477 are coupled to buffer booster amplifiers (BBAs) 480 and 482, respectively, which can be used to provide an electrical match between the DACs and the mixers (MIX) (frequency converters) 490 and 492. The mixers 490 and 492 modulate the signals, which are then transmitted through the antennas 116.

Figure 5:
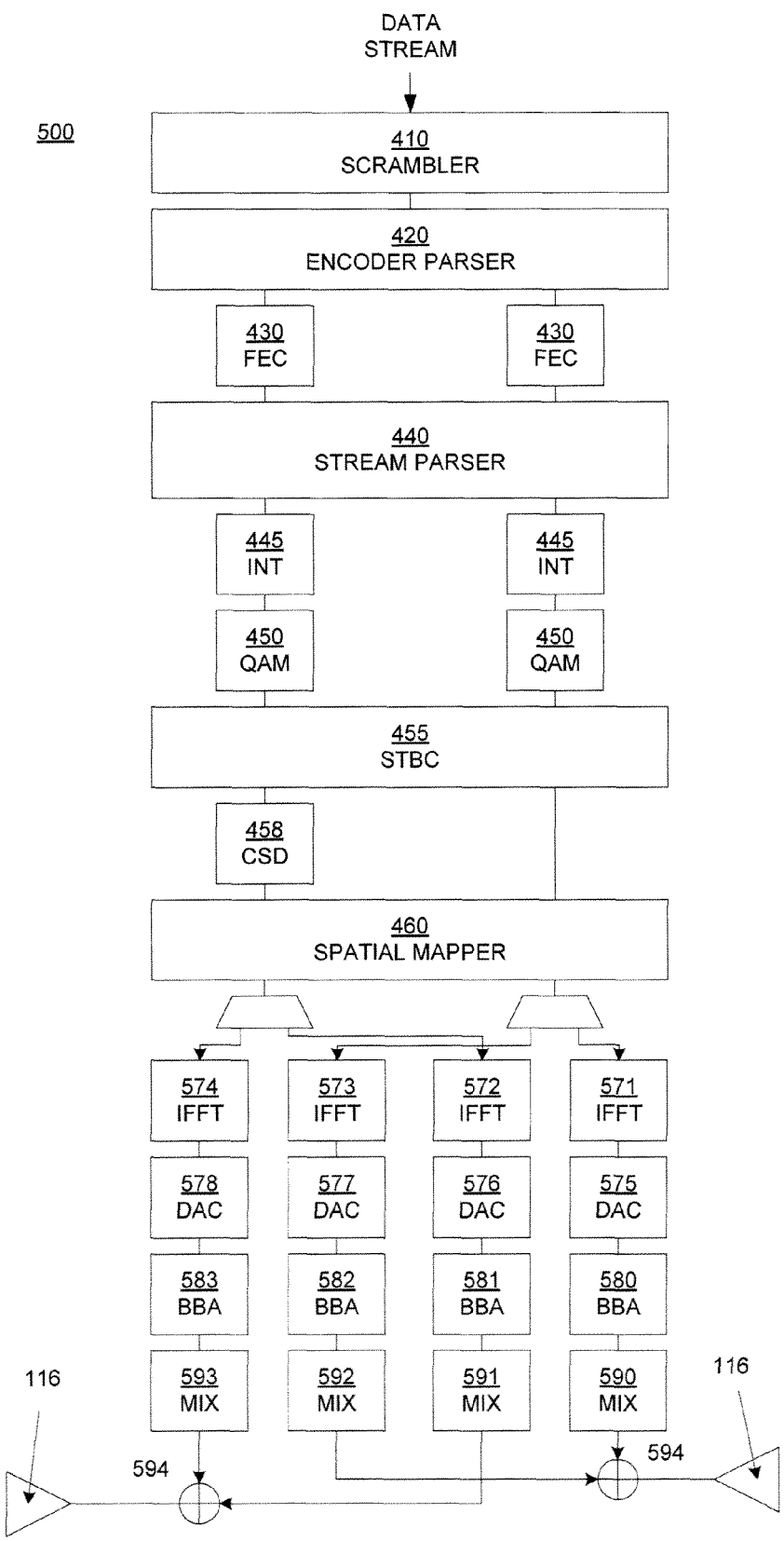
FIG. 5 is a block diagram of another example of a transmitter that can be used to implement embodiments according to the present invention.

FIG. 5 is a block diagram of another example of a transmitter 500 that can be used to implement embodiments according to the present invention. The transmitter 500 can implement the transmitter 100 of FIG. 1. The transmitter 500 can be used to generate signals having different combinations of frequencies (as shown in Table 2), depending on what frequencies are available as described above in conjunction with FIG. 2. Although FIG. 5 shows only two bandwidth modules, other embodiments may use three or more bandwidth modules. The bandwidth modules may support the same bandwidth (e.g. two bandwidth modules may each support an 80 MHz bandwidth), or they may support different bandwidths (e.g. one bandwidth module may support an 80 MHz bandwidth, and another bandwidth module may support a 40 MHz bandwidth).

The transmitter 500 is similar to the transmitter 400 of FIG. 4 in many respects, but includes additional elements downstream of the spatial mapper 460. More specifically, the transmitter 500 includes additional IFFTs 571, 572, 573, and 574 plus corresponding DACs 575, 576, 577, and 578, BBAs 580, 581, 582, and 583, and mixers 590, 591, 592, and 593. Each additional IFFT and DAC can support separate frequency bands that may be separated from or adjacent to each other, as described previously herein. In this manner, the data stream is mapped into particular (different and independent) frequency bands that need not be adjacent to each other in frequency. Note that multiple streams can be combined after mixers 590-593. For example, in the case of an initial 160 MHz stream, two 512 point IFFTs can be used for encoding. In FIG. 4, this initial 160 MHz can be split into two 80 MHz streams, but each stream needs a 256 point IFFT. Because each of the two streams work on one-half (½) of the 512 tones, the two streams can be summed by the adders 594 that follow mixers 590-593. Furthermore, each band may use an independent modulation and coding scheme (MCS) from the other bands.

Figure 6:
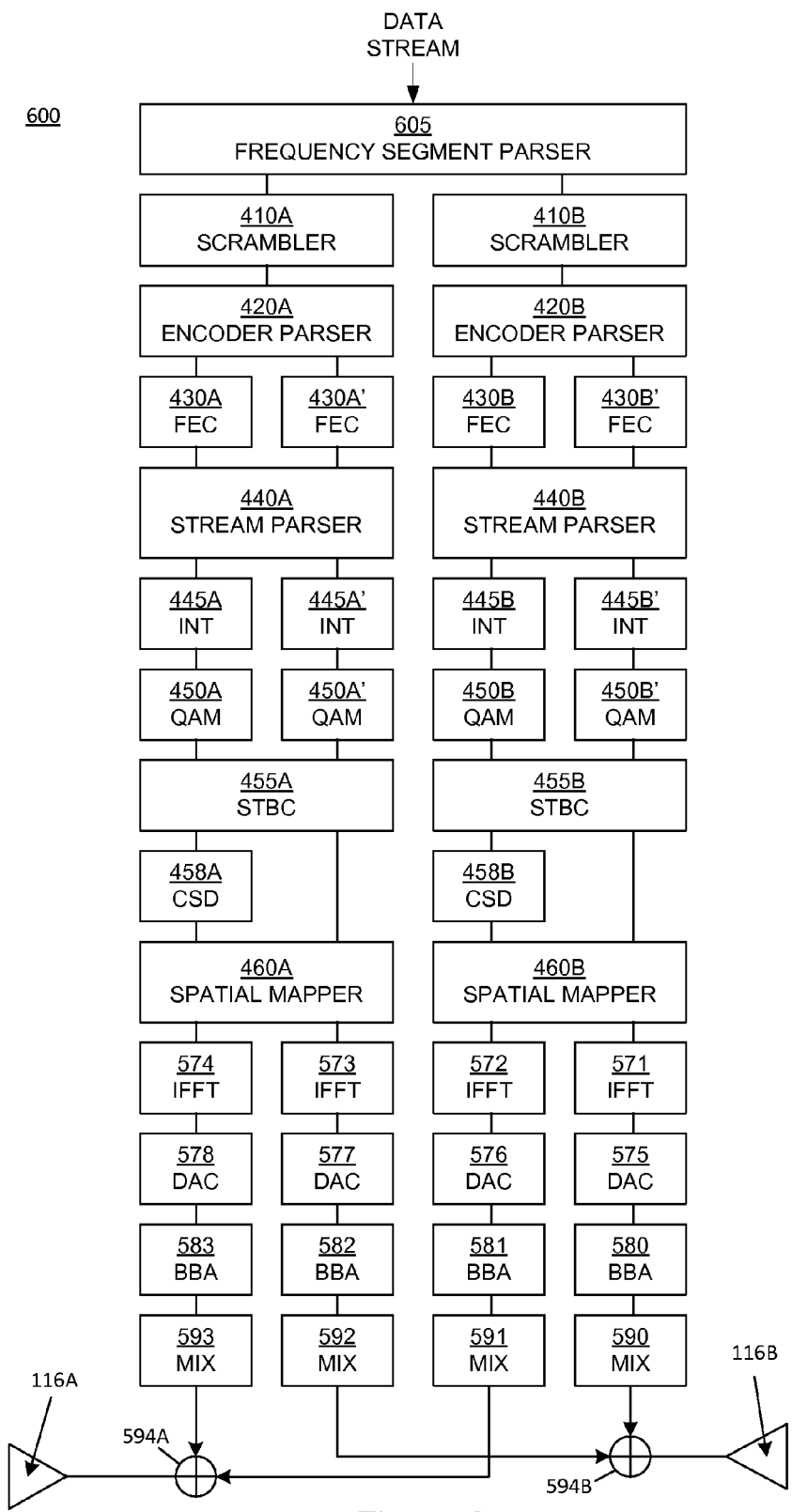
FIG. 6 is a block diagram of another example of a transmitter that can be used to implement embodiments according to the present invention.

FIG. 6 is a block diagram of another example of a transmitter 600 that can be used to implement embodiments according to the present invention. FIG. 6 show an architecture for VHT 160: Parallel 80 MHz PHY. In one embodiment, it is more cost effective to duplicate logic than build faster logic. Transmitter 600 includes frequency segment parser 605, scrambler 410A and 410B, encoder parsers 420A and 420B, FEC blocks 430A-430A' and 430B-430B', stream parsers 440A and 440B, interleavers 445A-445A' and 445B-445B', QAM blocks 450A-450A' and 450B-450B', space-time block coders (STBC) 455A and 455B, cyclic shift delayers (CSDs) 458A and 458B, spatial mappers 460A-460B, IFFT processors 571-574, digital to analog converters (DACs) 575-578, (buffer booster amplifiers (BBAs) 580-583, mixers 590-593, adders 594A and 594B and antennas 116A and 116B. The transmitter 600 can implement the transmitter 110 of FIG. 1. The transmitter 600 is useful for implementations in which the frequency segments S1 and S2 (FIG. 2) are either contiguous or non-contiguous. The transmitter 600 can be used to generate signals having different combinations of frequencies (as shown in Table 2), depending on what frequencies are available as described above in conjunction with FIG. 2. Although FIG. 6 shows only two bandwidth modules, other embodiments may use three or more bandwidth modules. The bandwidth modules may support the same bandwidth, or they may support different bandwidths.

The transmitter 600 is similar to the transmitters 400 and 500 of FIGS. 4 and 5 in many respects, but includes a frequency segment parser 605 that splits the data stream into two streams prior to the encoding function. In the example of FIG. 6, the frequency segment parser 605 is located before the scramblers 410A and 410B. Alternatively, the frequency segment parser 605 can be located after the scramblers 410 and before the encoder parsers 420A and 420B.

Figure 7A:
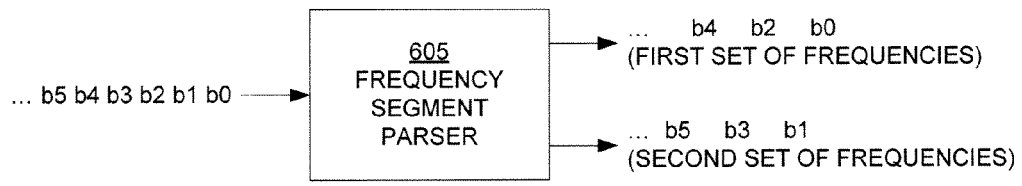
FIGS. 7A and 7B illustrate an example of a frequency segment parser in operation in embodiments according to the present invention.

The frequency segment parser 605 is described with reference to FIGS. 7A and 7B. In the example of FIG. 7A, the available (selected) bandwidths are equal in width. For example, the selected (available) combination of frequency bands may include two 80 MHz bands (e.g., frequency bands B1-B4 of FIG. 2), or two 40 MHz bands (e.g., the same combination of frequency bands, or two different combinations of two bands, selected from the bands B1-B4 of FIG. 2). In either case, the frequency segment parser 605 can divide the incoming data stream equally among the selected frequency bands by, for example, allocating even bits (b0, b2, b4 . . . ) to one of the selected bands and odd bits (b1, b3, b5 . . . ) to the other selected band, as shown in FIG. 7A.

Figure 7B:
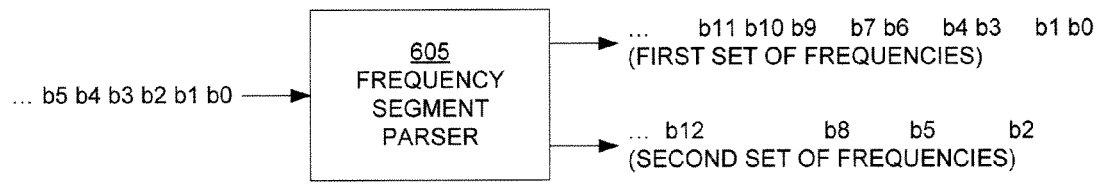

In the example of FIG. 7B, the available (selected) bandwidths are not equal in width. For example, the selected (available) combination of frequency bands may include one 80 MHz band (e.g., segment S1 of FIG. 2) and one 40 MHz band (e.g., band B3 or B4 of FIG. 2). In that situation, the frequency segment parser 605 divides the incoming data stream unequally among the selected frequency bands, e.g. as shown in FIG. 7B. Note that even though in this exemplary parsing one band has a width twice that of the other band, the number of bits allocated to the wider band is not necessarily twice the number of bits allocated to the narrower band. The number of tones at 80 MHz (234 tones) is more than twice the number of tones at 40 MHz (108 tones), and so the amount of data transmitted in the wider band will be more than twice the amount of data transmitted in the narrower band. To accommodate this, the frequency segment parser 605 sometimes allocates two bits to the wider band for each bit allocated to the narrower band, and at other times it allocates three bits to the wider band for each bit allocated to the narrower band.

With reference back to FIG. 6, the data from the spatial mappers 460A and 460B may be mapped to two or more contiguous or non-contiguous frequency bands as in the example of FIG. 5. Since each of the IFFTs 571-574 is independent, the frequency bands can also be independent (thus the frequency bands need not be adjacent to one another). Furthermore, signals transmitted on independent frequency bands may be independently encoded with different MCSs.

Figure 8A:
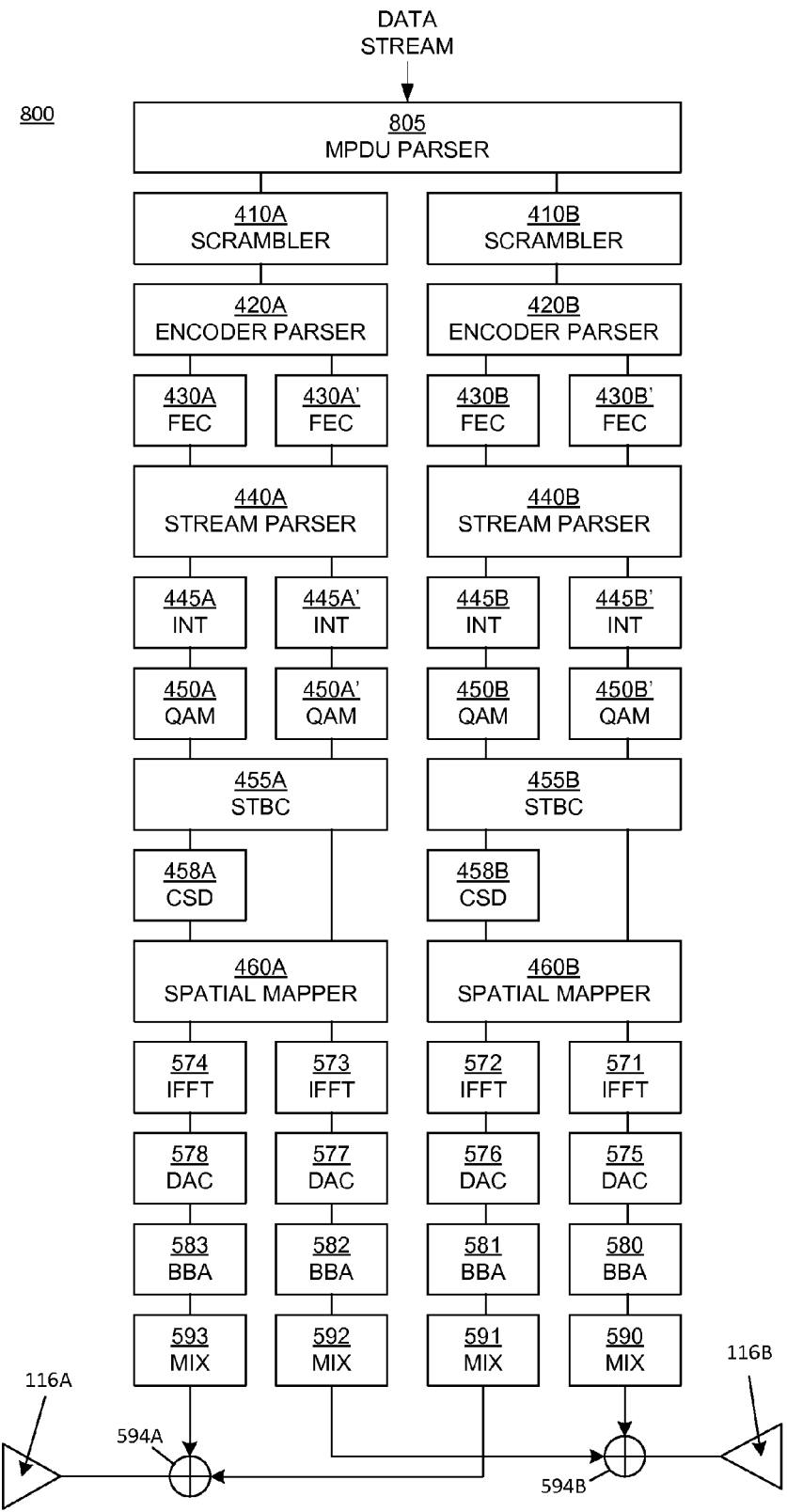
FIG. 8A is a block diagram of another example of a transmitter that can be used to implement embodiments according to the present invention.

FIG. 8A is a block diagram of another example of a transmitter 800 that can be used to implement embodiments according to the present invention. The transmitter 800 can implement the transmitter 110 of FIG. 1. FIG. 8A shows a dual MAC stream, parallel 80 MHz PHY architecture. Transmitter 800 includes MPDU parser 805, scramblers 410A and 410B, encoder parsers 420A and 420B, FEC blocks 430A-430A' and 430B-430B', stream parsers 440A and 440B, interleavers 445A-445A' and 445B-445B', QAM blocks 450A-450A' and 450B-450B', space-time block coders (STBC) 455A and 455B, cyclic shift delayers (CSDs) 458A and 458B, spatial mappers 460A-460B, IFFT processors 571-574, digital to analog converters (DACs) 575-578, (buffer booster amplifiers (BBAs) 580-583, mixers 590-593, adders 594A and 594B and antennas 116A and 116B. The transmitter 800 is useful for implementations in which the frequency segments S1 and S2 (FIG. 2) are either contiguous or non-contiguous. The transmitter 800 can be used to generate signals having different combinations of frequencies (as shown in Table 2), depending on what frequencies are available as described above in conjunction with FIG. 2. Although FIG. 8A shows only two bandwidth modules, other embodiments may use three or more bandwidth modules. The bandwidth modules may support the same bandwidth, or they may support different bandwidths.

The transmitter 800 is similar to the transmitters 400, 500, and 600 of FIGS. 4, 5, and 6 in many respects, but includes a MAC (media access control) protocol data unit (PDU) parser 805 located before the scramblers 410A and 410B. Alternatively, the MPDU parser 805 can be located after the scramblers 410A and 410B and before the encoder parsers 420A and 420B.

Figure 8B:
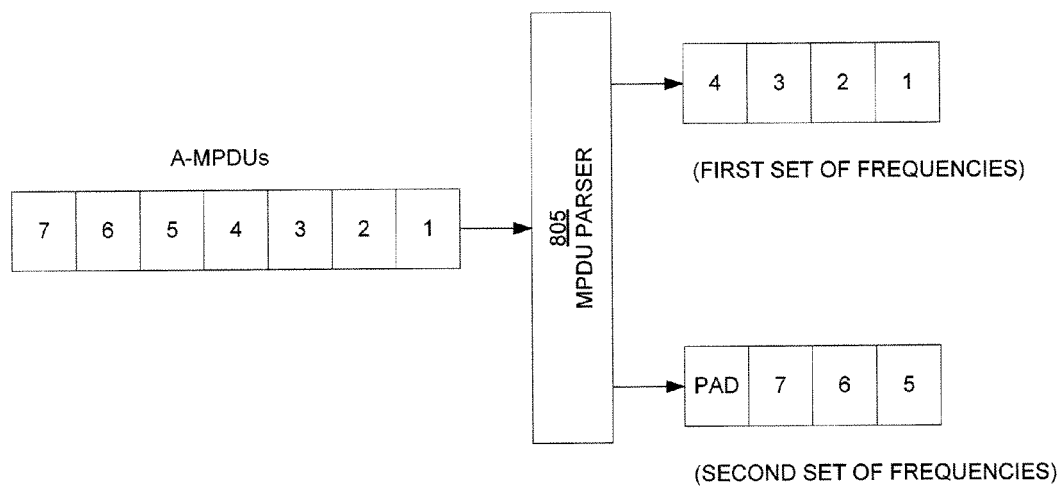
FIG. 8B illustrates an example of a media access control protocol data unit (MPDU) parser in operation in an embodiment according to the present invention.

The MPDU parser 805 is described with reference to FIG. 8B. Instead of parsing the incoming data stream bit-by-bit like the frequency segment parser 605 of FIG. 6, the MPDU parser 805 parses aggregate MPDUs (A-MPDUs) subframes and allocates the subframes to the selected (available) frequency bands. More specifically, in the example of FIG. 8B, an A-MPDU subframe that includes MPDUs 1, 2, and 3 are allocated to a first set of available frequency bands, and an A-MPDU subframe that includes MPDUs 4, 5, 6, and 7 are allocated to a second set of available frequency bands. Padding can be included so that the number of bits allocated to each of the sets of frequency bands is equivalent.

In summary, embodiments according to the present invention allow a first combination of frequency bands to be selected for transmitting a first data packet, and a second, different combination of frequency bands to be selected for transmitting a second data packet. In one such embodiment, a data stream is divided into a first set of data (e.g., bits or MPDUs) and a second set of data (e.g., bits or MPDUs). The first set of data is allocated to the first combination of frequency bands, and the second set of data is allocated to the second combination of frequency bands.

Thus, if an entire frequency spectrum (e.g., a 160 MHz spectrum) is not available, at least the available portion of that spectrum may be used to transmit data packets. Consequently, utilization of the spectrum is improved, and the total amount of time (measured as elapsed time) needed to transmit a given quantity of data (or number of data packets) can be reduced.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

Embodiments according to the invention are thus described. While the present disclosure has been described in particular embodiments, it should be appreciated that the invention should not be construed as limited by such embodiments, but rather construed according to the below claims.

The invention claimed is:

1. A method comprising:
   selecting a first combination of frequency bands for transmitting a first data packet, wherein said first combination of frequency bands is selected from a frequency spectrum that includes a first frequency segment and a second frequency segment, wherein the first frequency segment includes a first set of frequency bands, and the second frequency segment includes a second set of frequency bands, wherein said first combination of frequency bands includes a first set of frequencies, and a second set of frequencies different from the first set of frequencies;
   parsing a data stream associated with the first data packet into a first set of data and a second set of data, said first set of data allocated to said first set of frequencies and said second set of data allocated to said second set of frequencies;
   processing the first set of data in parallel with the second set of data, said parallel processing including spatially mapping said first set of data to a first set of streams using a first spatial mapper, and spatially mapping said second set of data to a second set of streams using a second spatial mapper, separate from the first spatial mapper;
   processing each of said first set of streams separately to provide a first set of processed streams, and processing each of said second set of streams separately to provide a second set of processed streams;
   summing a first stream of said first set of processed streams and a first stream of said second set of processed streams for transmission on a first antenna; and
   summing a second stream of said first set of processed streams and a second stream of said second set of processed streams for transmission on a second antenna.

2. The method of claim 1, wherein said first combination of frequency bands includes one or more frequency bands in the first set of frequency bands, and one or more frequency bands in the second set of frequency bands.

3. The method of claim 2, wherein said first segment is not contiguous with said second segment.

4. The method of claim 2, wherein said first segment and said second segment each have a bandwidth of 80 MHz.

5. The method of claim 1, wherein each frequency band in said first combination of frequency bands has a bandwidth selected from a group including: 20 MHz, 40 MHz, and 80 MHz.

6. The method of claim 1 further comprising:
   including information in said first data packet that identifies frequency bands included in said first combination of frequency bands.

7. The method of claim 1 further comprising:
   setting a first bit set value in a designated field of said first data packet to identify a frequency band included in said first combination of frequency bands.

8. A method comprising:
   obtaining information identifying a first plurality of frequencies available for transmitting a first data packet;
   transmitting said first data packet using a first combination of frequency bands selected from said first plurality of frequencies;
   obtaining information identifying a second plurality of frequencies available for transmitting a second data packet; and
   transmitting said second data packet using a second combination of frequency bands selected from said second plurality of frequencies, wherein said first combination of frequency bands is different than said second combination of frequency bands,
   wherein transmitting said first data packet includes:
      parsing a data stream associated with said first data packet into a first set of data and a second set of data, wherein said first set of data is allocated to a first set of frequencies within the first combination of frequency bands, and said second set of data is allocated to a second set of frequencies within the first combination of frequency bands;

processing the first set of data in a first processing path including a first spatial mapper configured for processing data allocated to the first set of frequencies, wherein the first spatial mapper provides a first set of processed streams;

processing the second set of data in a second processing path including a second spatial mapper configured for processing data allocated to the second set of frequencies, wherein the second spatial mapper provides a second set of processed streams;

summing a first processed stream from the first set of processed streams and a first processed stream from the second set of processed streams to produce a first signal for transmission on a first antenna; and summing a second processed stream from the first set of processed streams and a second processed stream from the second set of processed streams to produce a second signal for transmission on a second antenna.

9. The method of claim 8, wherein transmitting said second data packet includes:

parsing a data stream associated with said second data packet into a third set of data and a fourth set of data, wherein said third set of data is allocated to a third set of frequencies within the second combination of frequency bands, and said fourth set of data is allocated to a fourth set of frequencies within the second combination of frequency bands;

processing the third set of data in the first processing path, including the first spatial mapper configured for processing data allocated to the third set of frequencies, wherein the first spatial mapper provides a third set of processed streams;

processing the fourth set of data in the second processing path, including the second spatial mapper configured for processing data allocated to the fourth set of frequencies, wherein the second spatial mapper provides a fourth set of processed streams;

summing a first processed stream from the third set of processed streams and a first processed stream from the fourth set of processed streams to produce a third signal for transmission on the first antenna; and summing a second processed stream from the third set of processed streams and a second processed stream from the fourth set of processed streams to produce a fourth signal for transmission on the second antenna.

10. The method of claim 8, wherein the first and second plurality of frequencies exist within a frequency spectrum comprising a first segment of frequencies and a second segment of frequencies, said first segment comprising a first set of frequency bands and said second segment comprising a second set of frequency bands.

11. The method of claim 10, wherein said first set of frequency bands is not contiguous with said second set of frequency bands.

12. The method of claim 10, wherein said first set of frequency bands and said second set of frequency bands each has a bandwidth of 80 MHz, and wherein each frequency band in said first combination of frequency bands and each frequency band in said second combination of frequency bands has a bandwidth selected from a group including: 20 MHz, 40 MHz, and 80 MHz.

13. The method of claim 8, further comprising:

including information in said first data packet that identifies frequency bands included in said first combination of frequency bands; and including information in said second data packet that identifies frequency bands included in said second combination of frequency bands.

14. The method of claim 8, further comprising:

setting a first bit set value in a designated field of said first data packet to identify a frequency band included in said first combination of frequency bands; and setting a second bit set value in the designated field of said second data packet to identify a frequency band included in said second combination of frequency bands.

15. A device comprising:

means for selecting a first combination of frequency bands for transmitting a first data packet, is selected from a frequency spectrum that includes a first frequency segment and a second frequency segment, wherein the first frequency segment includes a first set of frequency bands, and the second frequency segment includes a second set of frequency bands, wherein said first combination of frequency bands includes a first set of frequencies, and a second set of frequencies different from the first set of frequencies;

means for parsing a data stream associated with the first data packet into a first set of data and a second set of data, said first set of data allocated to said first set of frequencies and said second set of data allocated to said second set of frequencies;

means for processing the first set of data in parallel with the second set of data, including means for spatially mapping said first set of data to a first set of streams, and means for spatially mapping said second set of data to a second set of streams;

means for processing each of said first set of streams separately to provide a first set of processed streams;

means for processing each of said second set of streams separately to provide a second set of processed streams;

means for summing a first stream of said first set of processed streams and a first stream of said second set of processed streams for transmission on a first antenna; and means for summing a second stream of said first set of processed streams and a second stream of said second set of processed streams for transmission on a second antenna.

* * * * *